United States Patent [19]

Beggiato

[11] Patent Number: 5,042,130

[45] Date of Patent: Aug. 27, 1991

[54] HOSE-REPAIR TOOL

[76] Inventor: Antonio Beggiato, 810 Charlotte Ter., Ridgefield, N.J. 07657

[21] Appl. No.: 627,713

[22] Filed: Dec. 14, 1990

[51] Int. Cl.[5] ..................... B23P 19/00

[52] U.S. Cl. ..................... 29/237

[58] Field of Search ..................... 29/234, 235, 237, 263, 29/256, 282, 280

[56] References Cited

U.S. PATENT DOCUMENTS

| | | | |
|---|---|---|---|
| 3,368,270 | 2/1968 | Babian | 29/237 |
| 3,653,114 | 4/1972 | Bawden et al. | 29/237 |
| 3,662,451 | 5/1972 | Wagner | 29/237 |
| 4,574,447 | 3/1986 | Bailey | 29/263 |

*Primary Examiner*—Robert C. Watson
*Attorney, Agent, or Firm*—Hopgood, Calimafde, Kalil, Blaustein & Judlowe

[57] ABSTRACT

The invention contemplates a unit-handling tool, suitable for field use, for selective extraction or assembly of an end fitting to an end of flexible hose. The tool features a cylindrical anvil which is sized for running clearance with the bore of the end fitting and with the bore of the hose, for insertion through and beyond the distal end of the fitting. The tool provides clamping elements with means for squeezing a hose securely against the anvil and at a location close to but beyond the inner axial end of an end fitting for the hose. The clamped region is longitudinally connected via a differential-action jack screw to structure which is engageable to the exposed longitudinal end of the end fitting; rotation of the jack screw in one direction, as by wrench torque, will drive a new fitting into telescoped assembly to the bore of a hose end, while rotation of the jack screw in the opposite direction will extract an end fitting from a hose. In an assembly operation, the jack-screw connection to the clamped region is in tension, and in an extraction operation, the jack-screw connection to the clamped region is in compression.

8 Claims, 1 Drawing Sheet

HOSE-REPAIR TOOL

BACKGROUND OF THE INVENTION

The invention relates to a hose-repair tool for use in assembly and/or disassembly of a hose-coupling element with respect to an end of flexible hose, such as a hose for conduct of liquid or gaseous fluid. My copending application Ser. No. 549,770 discloses one such tool which is virtually unit-handling and which provides exposed wrench flats for ease of operation; the disclosure of said copending application is hereby incorporated by reference.

It often occurs, as in the course of a relatively large-scale construction project, that flexible hose, for the flexible delivery of water, steam, compressed air, or the like, is damaged or broken through careless handling of heavy mobile equipment. Such hoses may have an inside diameter in the order of 2 inches and a wall thickness of $\frac{3}{8}$ to $\frac{1}{2}$ inch and are of construction suited to the task, as for example elastomeric materials that are reinforced with multiple braided plies of synthetic filaments and steel wire. The hoses are costly, and the same may be said of coupling elements fitted and tightly clamped to the end of each length of hose. When time is important to completion of a project, it frequently occurs that a complete new hose length with its end-coupling fitments will be placed into service, leaving the broken or damaged hose for discard, to be scrapped. This is, of course, a wasteful practice, and it is also wasteful of crew time if one even tries to salvage the end-coupling elements of a damaged hose; this is so, because with prolonged use and exposure, the rubber or other elastomeric of the hose becomes effectively vulcanized and locked to the end-coupling elements, and sledge-hammer and other abusive techniques may be required to reclaim an end fitting. Except for the disclosure in said copending application, I am unaware of any existing tool or technique for quick and damage-free recovery of an end fitting from a damaged hose.

BRIEF STATEMENT OF THE INVENTION

It is an object of the invention to provide a tool for quickly and efficiently removing an end fitting of the character indicated from a damaged length of hose.

Another object is to meet the above object with a tool that is equally applicable to the quick and efficient assembly of a new or reclaimed end fitting to the unfitted end of a new or reclaimed length of hose.

A further object is to meet the above objects with a relatively simple tool which is portable and particularly adapted to field use.

A still further object is to meet the above objects with a tool which, although more simple and less expensive, will nevertheless achieve almost all of the effectiveness of the tool of said copending application.

The invention achieves the foregoing objects in a unit-handling tool which requires only that a standard hose clamp be additionally provided. The tool itself provides a cylindrical anvil sized for running fit within the bore of a conventional end fitting and associated hose. The standard hose clamp contributes means for squeezing a hose securely against the anvil and at a location close to but beyond the inner axial end of an end fitting for the hose. Screw-jacking structure includes an elongate rod having first threaded connection at one end to the anvil of the clamped region; the other end of the rod has second threaded connection to jack-referencing structure which is engageable to the exposed longitudinal end of the end fitting. The first and second threaded connections are characterized by a difference in threaded advance, whereby wrench-driven rotation of the rod, with respect to the two differently threaded end connections thereto, differentially develops a longitudinally directed force which will either remove an end fitting from (or assemble an end fitting into telescoped assembly to) the bore of a hose end, depending upon the driven direction of rod rotation. In an assembly operation, the central portion of the rod, between the two different thread connections, is in tension; and in an extraction operation, the central portion of the rod, between the two different thread connections, is in compression.

DETAILED DESCRIPTION OF THE INVENTION

The invention will be described in detail for a preferred embodiment, in conjunction with the accompanying drawings, in which.

Figure 1:
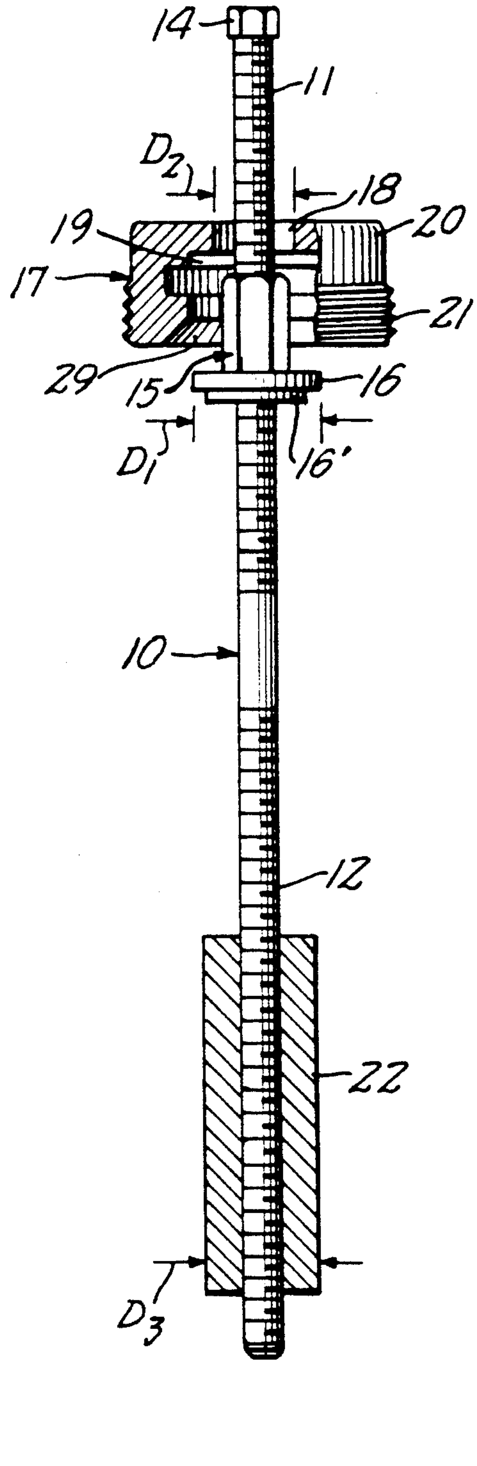
FIG. 1 is a view in side elevation, showing the tool of my invention, with certain elements broken-away and in longitudinal section.

Referring initially to FIG. 1, the tool of the invention is seen to comprise an elongate jack rod 10 having first and second different threads 11, 12 in the generally upper and lower half regions of rod 10. In each case, the threads are preferably Acme threads, but the threads at 11 are characterized by a different helical advance, as compared with those at 12. A bolt head 14 is welded to or otherwise formed at the upper end of rod 10, whereby the tool is adapted to torquing of rod 10, using a common, relatively small crescent or other wrench.

A flanged nut 15 has threaded engagement to the upper threads 11 of rod 10. Nut 15 is characterized by longitudinally elongate wrench flats and by a lower flange 16, of diameter $D_1$.

An annular plug 17 is loosely assembled over head 14, and between head 14 and nut 15. Plug 17 has (i) a bore 18 of diameter $D_2$ to safely clear interference with the flats of nut 15 and (ii) a counterbore 19 to receive, seat and locate flange 16 when the tool is used in its extraction mode. When thus seated, the flats of nut 15 extend axially beyond the upper axial end of plug 17, for a wrenching hold against rotation, while rod 10 is driven by wrench-torquing application at 14, as will be later explained. The exterior of plug 17 is characterized by upper wrench flats 20 and by lower threads 21, which are needed only in the extraction mode of the tool.

At the lower end of the tool, a tubular anvil 22 has threaded engagement to the lower threads 12 of rod 10. The diameter $D_3$ of anvil 22 is selected for close but running clearance with the bore 25 of an end fitting 26 and also for running clearance with the unstressed bore 27 of an end 28 of hose 30 fitted thereto (see FIG. 3); thus, in use of the tool, anvil 22 is freely insertable through an end fitting 26 and into a region of the hose bore (27) that is axially beyond the distal end 31 of the fitting.

Figure 2:
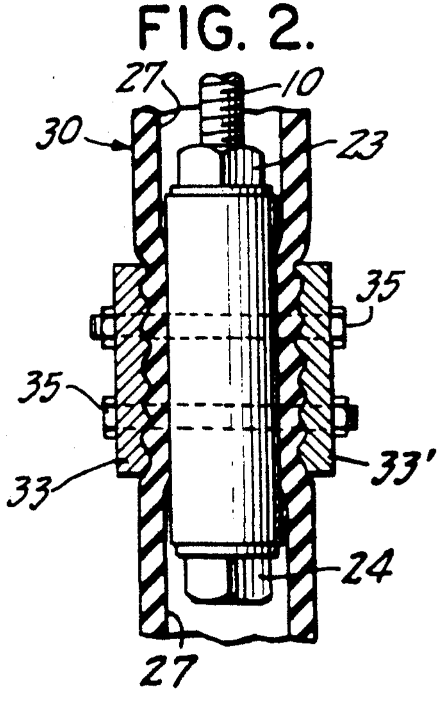
FIG. 2 is a fragmentary view in partial section to provide detail of the engagement of a standard (i.e. conventional) clamp in hose-clamping engagement to the lower end of the tool of FIG. 1.

In use of the tool, the axial overlap between hose 30 and anvil 22 must be clamped, and a conventional clamp serves the purpose. Such a clamp is shown in FIG. 2 to comprise two opposed cylindrically arcuate halves 33, 33' with integral side-flange formations (not shown) whereby pairs of bolts 35 through these flanges may be driven to apply a clamping squeeze of the hose 30 against the anvil. As shown, each half 33, 33' of the clamp is internally characterized by ribbing which is seen as an undulation in FIG. 2, for enhanced local engagement to and indentation of the hose.

Figure 3:
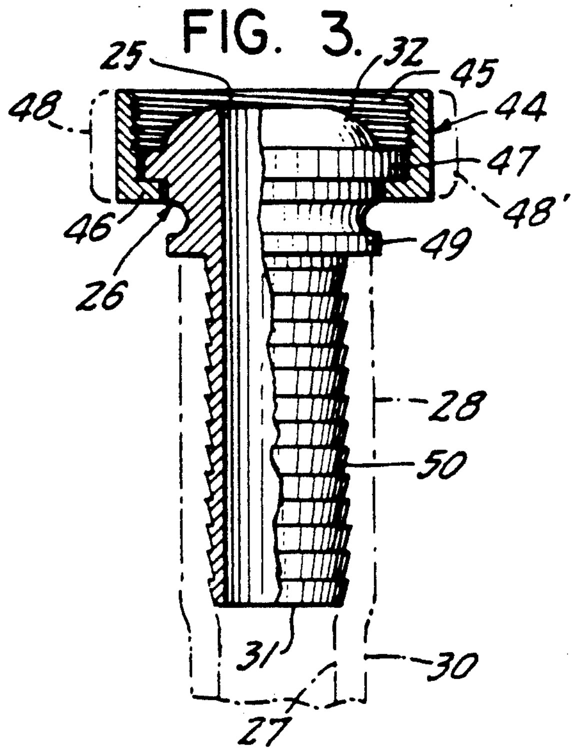
FIG. 3 is a view in side elevation, partly broken-away and in section, to show a hose-end fitting, illustratively suited for assembly to or disassembly from a hose end, using the tool of FIG. 1.

It is meaningful to observe that end fittings of relevance to the presently described embodiment of the invention comprise two parts, namely, a tubular part 26, as seen in FIG. 3, and a coupling-ring part 44. The coupling ring 44 has internal threads 45 and a lower-end flange 46, which is radially inward to establish a shoulder beneath a flange formation 47 of the tubular end fitting 26. Phantom outlines 48, 48' are suggestive of diametrically opposed outward lug formations which are the standard complement of commercial fittings, but these formations serve no purpose in use of the present invention. The tubular part 26 integrally includes another flange 49 which defines a shoulder against which the axial end of an assembled hose end 28 is drawn, prior to clamping; such clamping is by well-known means that is irrelevant to the invention and is therefore not shown. Peripheral ribbing on the exterior of the elongate tail 50 of part 26 is standard, for enhanced axial retention when clamped.

In use as an extraction device, the tool of FIG. 1 must operate upon the fitting parts 26, 44 of FIG. 3 to which a hose end 28 has become tightly connected, even after external clamps (not shown) along the hose end 28 have been removed. First of all, the lower end of the tool, including anvil 22, is inserted through the bore 25 of fitting 26 and into the unstressed bore of hose 30, i.e. so that the anvil axially clears the bore 25. At this point, bolts 35 and associated nuts are driven to tighten the clamp halves 33, 33' into tight local compression and deformation of hose 30 against anvil 22, as shown in FIG. 2. Having thus set a clamped reference for the mandrel (22) part of the tool, nut 15 is run down the upper threads of rod 10 until its flange 16 contacts (or almost contacts) the convex spherically finished upper end 32 of fitting 26. In this relationship, it is a simple matter then to engage the external threads 21 of plug 17 with the internal threads 45 of the ring part 44 of the end fitting. When threads 21/45 are sufficiently engaged, the flange (16) of diameter $D_1$ will be concentrically located in the counterbore 19 of plug 17, and the elongate flats of nut 15 will be externally exposed for wrench-holding access above plug 17. In this engaged relationship, it will be noted that a concave spherical seat formation 29 of plug 17 may also engage the convex spherical seat formation 32 of fitting 26. By holding nut 15 against rotation while driving rod 10 in one direction of rotation (via wrenching torque at 14), nut 15 is caused to travel upward into firm engagement with plug 17.

If the difference in advance of threads at 11 and 12 is that their advances are in opposite directions of helical advance, then the indicated rod rotation which elevates nut 15 into engagement with plug 17 is accelerated by concurrent downward drive of mandrel 22 (and its clamped section of hose 30). Thereafter, continued rotation of rod 10 in the same direction, while wrench-holding at the flats of nut 15, places rod 10 in compression (between its two threaded engagements) and applies progressive elastic stretching force to hose 30, breaking the engagement of the hose to tail piece 50, and eventually removing the fitting and its ring 44 from the hose end 28.

If on the other hand, the difference in advance of threads at 11 and 12 is that their advances are in the same direction but with different pitches of helical advance, rotation of rod 10 while wrench-holding at the flats of nut 15 will be understood to develop a differential action, which displaces nut 15 and mandrel 22 away from each other for one direction of rod rotation, and which displaces nut 15 and mandrel 22 toward each other for the opposite direction of rod rotation.

In use of the invention in the assembly mode, a hose 30 to receive a fitting 26 (with ring 44) is first clamped against anvil 22 in the manner already described, but at a location which clears the end of the hose by at least the length of end fitting 26. The distal end 31 of the tail 50 is then positioned for entry into the exposed open end of the hose, while nut 15 is manipulated into contact with the upper end of fitting 26; at this point, an axially short reduced cylindrical land portion 16' of the underside of flange 16 sufficiently enters the bore 25 of fitting 26, so as to maintain concentricity of nut (15) to fitting (26) engagement. Wrenching torque applied at 14 (with wrenching retention of nut 15 against rotation) may then drive nut 15, and therefore also fitting 26, for assembling entry into the hose end, to the point of completed assembly suggested by phantom outline 28 in FIG. 3. Nut 15 can be backed off (with respect to mandrel 22 and the fitting-assembled hose end), and clamp bolts 35 released, in order to permit tool removal (i.e. anvil 22 removal) from the now-assembled hose with parts 26, 44.

While it has been said above that plug 17 is not necessary for assembly-mode operations, plug 17 may nevertheless provide a useful stabilizing function, in that a threaded take-up of the engagement 21/45 can be made to the point of spherical-seat engagement at 29/32, in which case, the elongate flats of nut 15 will extend above plug 17, fully accessible for retaining-wrench access to nut 15, while applying jacking torque at 14, in the rotary direction to drive nut 15 and mandrel 22 in the direction of their axial advance toward each other, and developing tension in rod 10 (between the nut 15 and mandrel 22 engagements) to compel the assembly.

What is claimed is:

1. A hose-repair tool for use in assembly or disassembly of a hose-coupling element with respect to an end of a length of flexible hose, wherein the coupling element comprises an elongate tubular tail having a straight bore of substantially the nominal inside diameter of the hose, said tubular tail having an outwardly flanged coupling formation at one end, and wherein the coupling element further includes an internally threaded coupling ring that is rotatable with respect to and engaged to said flanged coupling formation; said tool comprising: an elongate rod with an elongate first threaded portion of first threaded advance extending within a first longitudinal half of said rod and with an elongate second threaded portion of second threaded advance extending within a second longitudinal half of said rod; a rigid annular anvil member having a bore in threaded engagement to one of the threaded portions of said rod, said anvil member having an outer diameter in running clearance with the bore of the coupling element, whereby said anvil and the rod portion to which it is threaded may be axially inserted via the bore of the coupling element and into the hose beyond the end of the tail of the coupling element, further whereby an externally applied clamp applied over the hose at longitudinal lap with the anvil will produce clamped engagement of the hose to the anvil at longitudinal offset from the coupling element; a jacking element comprising a flanged nut in threaded engagement to the other of the threaded portions of said rod, said nut having elongate wrench flats above an outward flange at its lower end; and an externally threaded plug sized for selective engagement to the internal threads of said coupling ring, said plug having a central opening which clears said wrench flats but interferes with and therefore precludes through-passage of the flange of said nut.

2. The hose-repair tool of claim 1, in which said first and second threaded portions have opposite directions of threaded advance.

3. The hose-repair tool of claim 1, in which said first and second threaded portions have different pitches of threaded advance.

4. The hose-repair tool of claim 1, in which externally accessible wrench flats characterize that end of the threaded rod to which said nut is engaged.

5. The hose-repair tool of claim 1, wherein said plug has a counterbore at the lower axial end of said central opening, and said counterbore is sized to receive and centrally locate the flange of said nut.

6. The hose-repair tool of claim 1, wherein the outside diameter of the flange of said nut exceeds the bore diameter of the coupling element.

7. The hose-repair tool of claim 1, wherein the underside of the flange of said nut has a reduced-diameter concentric projection sized for centering location in the bore of said coupling element.

8. The hose-repair tool of claim 1, for use with a coupling element which has a convex spherical formation at its upper end, and in which the lower end of said plug has a concave spherical formation which has self-aligning engageability with said convex formation.

* * * * *